United States Patent [19]

Koeslin

[11] 3,952,545
[45] Apr. 27, 1976

[54] FLUID DAMPED RESILIENT DRIVE FOR A GOVERNOR

[75] Inventor: Werner H. Koeslin, Peoria, Ill.

[73] Assignee: Caterpillar Tractor Co., Peoria, Ill.

[22] Filed: July 3, 1974

[21] Appl. No.: 485,338

[52] U.S. Cl. .............................. 64/27 C; 64/15 C; 64/26; 64/27 R
[51] Int. Cl.² ......................................... F16D 3/14
[58] Field of Search ............. 64/27 R, 27 C, 27 CS, 64/15 R, 6, 9 A, 26, 15 C

[56] References Cited
UNITED STATES PATENTS

| 893,794 | 2/1908 | Girardot | 64/15 C |
|---|---|---|---|
| 1,324,890 | 12/1919 | Glenn | 64/27 C |
| 1,495,633 | 5/1924 | Dotes | 64/15 C |
| 2,571,802 | 10/1951 | Wilfley et al. | 64/27 R |
| 3,263,450 | 8/1966 | Condon | 64/26 |

FOREIGN PATENTS OR APPLICATIONS

| 1,274,314 | 11/1960 | France | 64/27 C |

Primary Examiner—Samuel Scott
Assistant Examiner—Randall Heald
Attorney, Agent, or Firm—Phillips, Moore, Weissenberger Lempio & Strabala

[57] ABSTRACT

A resilient drive comprises rotary driving and driven members interconnected by a resilient coupling. The coupling comprises a pair of coil springs and a plurality of spherical balls abutting the springs in circumferentially disposed relationship therewith. A pressurized fluid, such as oil, is continuously communicated to the coupling to aid in the damping function thereof.

11 Claims, 2 Drawing Figures

FLUID DAMPED RESILIENT DRIVE FOR A GOVERNOR

BACKGROUND OF THE INVENTION

The drive train of an internal combustion engine inherently creates vibrations during the operation thereof. Such vibrations, unless suitably dampened, will tend to adversely affect the engine-driven governor used in conjunction with the fuel control system thereof. Oil damped resilient couplings of the type employed in U.S. Pat. Nos. 2,841,000 and 2,860,497, both assigned to the assignee of this application, have thus been employed to overcome such problem. The state of art is further exemplified by U.S. Pat. Nos. 1,675,065; 1,717,816; 1,763,332; 1,972,779; 2,072,561; 2,407,144; and 2,897,660.

SUMMARY OF THIS INVENTION

An object of this invention is to provide an improved resilient coupling for efficiently damping vibrations occurring between rotary driving and driven members. The coupling comprises spring means and a plurality of members, each loosely mounted in a raceway defined between the driving and driven members. The balls are disposed in abutting and circumferentially disposed relationship with the spring means for vibration damping purposes. In the preferred embodiment of this invention, such members comprise spherical balls and means are provided for continuously communicating a pressurized fluid to the raceway to aid in the damping function.

BRIEF DESCRIPTION OF THE DRAWING

Other objects of this invention will become apparent from the following description and accompanying drawings wherein.

DETAILED DESCRIPTION

Figure 1:
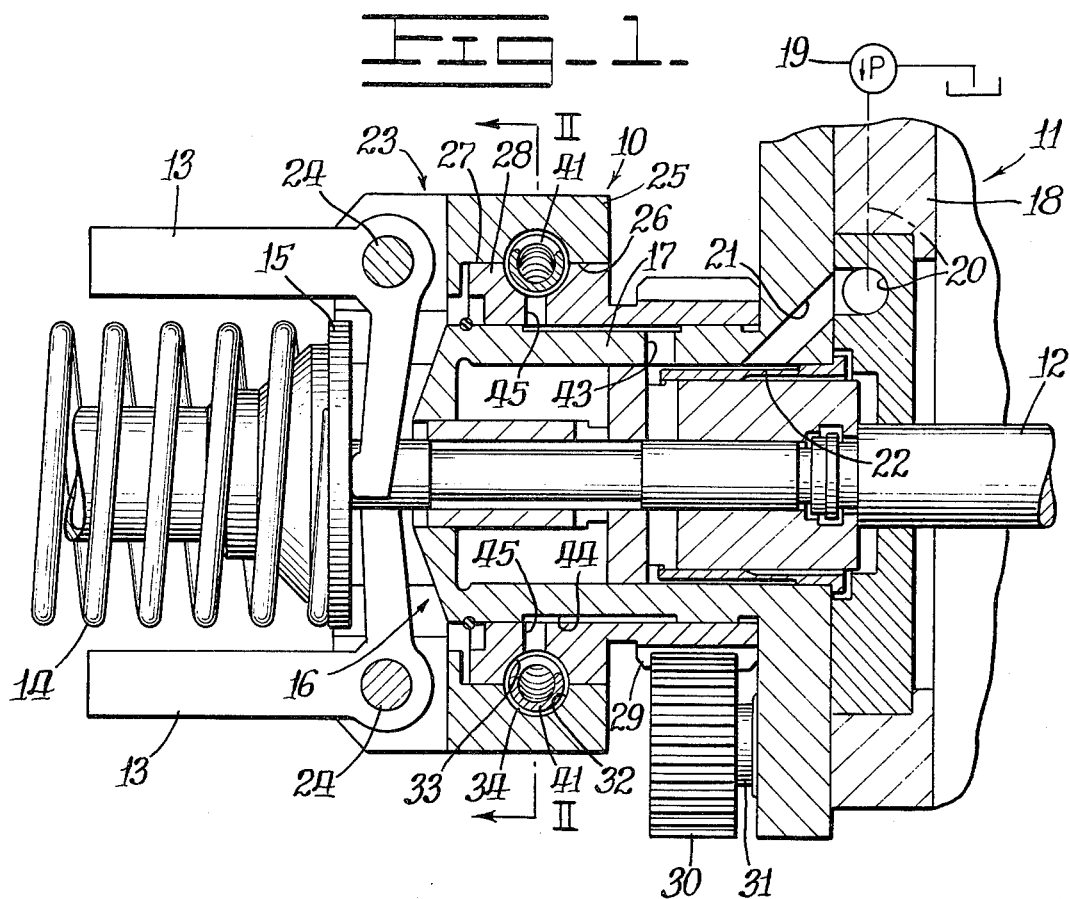
FIG. 1 is a longitudinal sectional view of a resilient drive employing the coupling means of this invention therein.

FIG. 1 illustrates a resilient drive 10 employed in combination with an engine-controlled governor 11. The governor may be of the type fully disclosed in U.S. Pat. No. 3,145,624, assigned to the assignee of this application, which functions to control the position of a reciprocally mounted fuel control member 12. The governor essentially comprises a pair of pivoted flyweights 13, a governor control spring 14 abutting a flange 15 and a servo mechanism 16, housed in a cylinder 17 bolted to a stationary housing 18.

As schematically illustrated in FIG. 1, an engine-driven pump 19 comprises means for continuously communicating pressurized engine oil internally of the drive via a passage 20, a port 21 and an annular groove 22. The flyweights are each pivotally attached to a carrier assembly 23 by a pin 24. The carrier assembly comprises an outer carrier or rotary driven member 25 having a bore 26 formed therein which telescopically receives an outer mating surface 27 of a cylindrical inner or rotary driving member 28 rotatably mounted on cylinder 17.

Figure 2:
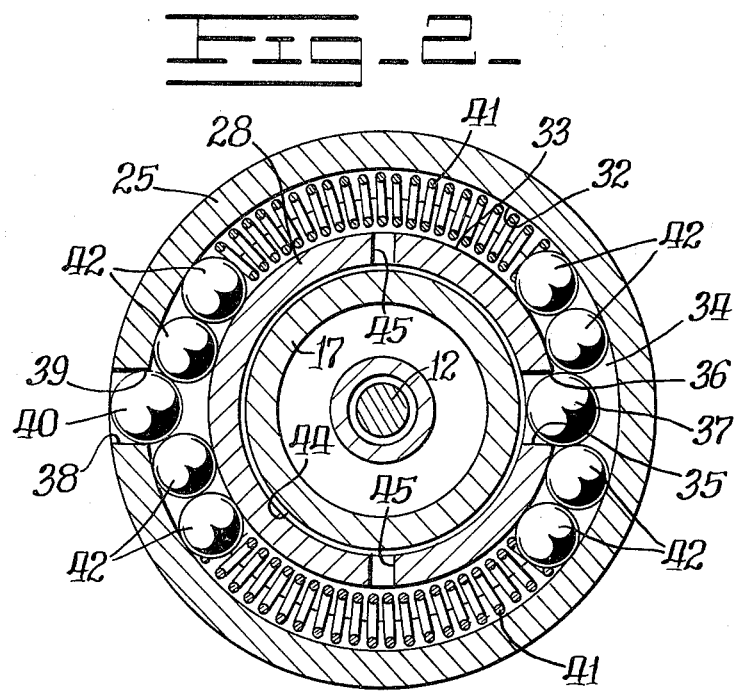
FIG. 2 is a cross sectional view taken in the direction of arrows II—II in FIG. 1.

A gear 29 is formed on the inner member and meshes with a drive gear 30 driven by a shaft 31 operatively connected to the drive train of the engine in a conventional manner. A pair of complementary annular grooves 32 and 33 are formed in bore 26 and surface 27, respectively, to form a substantially closed annular raceway 34 having a circular cross section. Referring to FIG. 2, a radially outwardly extending bore 35 is formed through a sidewall of inner member 28 to intersect annular groove 33 at a circular seat 36.

A first spherical drive ball or stop means 37 is press-fitted or otherwise suitably secured on the seat. Similarly, a radially outwardly extending bore 38 is formed through an outer wall of outer carrier 25, in diametric opposition to bore 35. Bore 38 terminates at a circular seat 39 having a second spherical driven ball or stop means 40 secured thereon.

A pair of diametrically opposed coil springs or spring means 41 are circumferentially disposed in raceway 34 along with a plurality of connecting members, preferably four pairs of spherical balls 42. The balls each have a diameter slightly less than balls 37 and 40 and also the diameter of the raceway to permit them to roll therein. A pair of such balls are disposed circumferentially between each end of each spring and a respective ball 37 or 40 to complete the resilient drive coupling between members 17 and 25.

Referring to FIG. 1, pressurized oil is communicated from annular groove 22 to a radial port 43 formed through a sidewall of cylinder 17. The port, in turn, communicates such oil to an annular groove 44 formed on the cylinder and to a pair of diametrically opposed radial ports 45 formed through inner member 28. The latter ports communicate such oil to raceway 34 to aid the springs and balls in their damping function.

In operation, drive gear 30 is rotated by the engine's drive train to rotate inner member 28. The inner member, in turn, rotates outer carrier 25 via the resilient coupling means comprising driving ball 37, balls 42, springs 41 and driven ball 40. The springs and balls cooperate to permit limited rotational movement of the inner member relative to the outer carrier in response to torsional loads or cyclic irregularities generated in the engine's drive train during operation thereof.

When the inner member and outer carrier are rotated in unison and the speed of the inner member is either increased or decreased, the appropriate spring 41 will be compressed to permit the relative rotative position of the inner member relative to the outer carrier to change slightly. As balls 42 at the opposite ends of the spring are moved towards one another, the pressurized oil retained in raceway 34 between the balls is forced therepast to dampen the reaction of the springs to thus minimize overshoot and rebound of the resilient drive. Such function at least substantially prevents the vibrations generated as a result of such speed increases and decreases from being transmitted to the outer carrier and flyweights which would otherwise adversely affect the smoothness of operation of the governor and its precisely calibrated control of fuel control member 12.

I claim:

1. A resilient drive mechanism in combination with a governor controlled fuel control means, said resilient drive mechanism comprising a rotary driving member, a rotary driven member, means defining an annular raceway between said driving and driven members, and resilient coupling means interconnecting said driving and driven members together comprising spring means, a plurality of connecting members loosely mounted in said raceway to abut said spring means in circumferentially disposed relationship therewith for damping vibrations in said resilient drive mechanism and stop means secured to each of said driving and driven members to radially extend into said raceway and each stop means interposed between and solely abutting a respective pair of circumferentially adjacent connecting members, and wherein said governor controlled fuel control means includes a movable fuel control member and is operatively connected to said driven member for moving said fuel control member in response to rotation of said driven member.

2. The mechanism of claim 1 wherein said spring means comprises at least one compression coil spring.

3. The mechanism of claim 2 wherein said spring means comprises a pair of diametrically opposed compression coil springs, said connecting members disposed in said raceway to abut each end of each of said springs.

4. The mechanism of claim 1 wherein said raceway has a circular cross section throughout the entire circumferential length thereof and wherein said connecting members each constitute a spherical ball having a diameter slightly less than the diameter of the cross sectional area of said raceway.

5. The mechanism of claim 4 wherein only four pairs of said balls are disposed in said raceway with each pair of circumferentially adjacent balls engaging each other.

6. The mechanism of claim 5 wherein said spring means constitute a pair of springs disposed in said raceway and wherein one ball of each pair of balls abuts an end of each of said springs.

7. The mechanism of claim 5 wherein the stop means secured to said driving member extends radially outwardly therefrom into said raceway, the stop means secured to said driven member extends radially inwardly therefrom into said raceway and each stop means being interposed between each of two respective pairs of said four sets of balls.

8. The mechanism of claim 7 wherein said stop means each constitutes a spherical ball.

9. The mechanism of claim 8 wherein the spherical ball constituting each of said stop means is securely seated in a bore formed in each of said driving and driven members.

10. The mechanism of claim 1 further comprising means for communicating a pressurized fluid to said coupling means.

11. A resilient drive mechanism comprising
a rotary driving member,
a rotary driven member,
means defining an annular raceway between said driving and driven members, and
resilient coupling means interconnecting said driving and driven members together comprising spring means, a plurality of connecting members loosely mounted in said raceway to abut said spring means in circumferentially disposed relationship therewith for damping vibrations in said resilient drive mechanism and stop means secured to each of said driving and driven members to radially extend into said raceway and each stop means interposed between and solely abutting a respective pair of circumferentially adjacent connecting members, said raceway having a circular cross section throughout the entire circumferential length thereof, said connecting members each constituting a spherical ball having a diameter slightly less than the diameter of the cross sectional area of said raceway and wherein only four pairs of said balls are disposed in said raceway with the balls of each pair of circumferentially adjacent balls engaging each other.

* * * * *